(12) United States Patent
Koh

(10) Patent No.: US 8,429,337 B2
(45) Date of Patent: Apr. 23, 2013

(54) APPARATUS FOR CONTROLLING NAND FLASH MEMORY

(75) Inventor: Young-Sik Koh, Suwon Si (KR)

(73) Assignee: Eastwho Co., Ltd., Seoul (KR)

( * ) Notice: Subject to any disclaimer, the term of this patent is extended or adjusted under 35 U.S.C. 154(b) by 392 days.

(21) Appl. No.: 12/745,228

(22) PCT Filed: Oct. 30, 2008

(86) PCT No.: PCT/KR2008/006401
§ 371 (c)(1),
(2), (4) Date: Jul. 30, 2010

(87) PCT Pub. No.: WO2009/057955
PCT Pub. Date: May 7, 2009

(65) Prior Publication Data
US 2010/0325347 A1    Dec. 23, 2010

(30) Foreign Application Priority Data

Nov. 1, 2007    (KR) .................... 10-2007-0111226

(51) Int. Cl.
*G06F 12/00*    (2006.01)
(52) U.S. Cl.
USPC ........................ 711/103; 711/154; 711/170

(58) Field of Classification Search .................. 711/103, 711/154, 170
See application file for complete search history.

(56) References Cited

U.S. PATENT DOCUMENTS

| 4,447,877 A * | 5/1984 | Grondalski ................... 713/502 |
| 2005/0207231 A1 * | 9/2005 | Kim ......................... 365/185.33 |

* cited by examiner

*Primary Examiner* — Matthew Bradley
(74) *Attorney, Agent, or Firm* — William Park & Associates Ltd.

(57) ABSTRACT

The apparatus includes: a register unit in which a start address of a macro-command to be executed, is selected from macro-commands included in a command script in which at least one macro-command in which a plurality of micro-commands for controlling a unit operation of NAND flash memory are arranged in an array shape, is recorded; a command fetch unit accessing first memory connected based on the start address of the macro-command to be executed and sequentially reading the plurality of micro-commands from the start address of the macro-command to be executed; a command interpretation unit interpreting the read micro-commands and outputting the result of interpretation including types of the micro-commands and command parameters; and a command execution unit generating interface signals for controlling an operation of NAND flash memory according to each of the micro-commands based on the result of interpretation.

16 Claims, 12 Drawing Sheets

APPARATUS FOR CONTROLLING NAND FLASH MEMORY

TECHNICAL FIELD

The present invention relates to an apparatus for controlling NAND flash memory, and more particularly, to an apparatus for controlling data transmission between NAND flash memory and a central processing unit (CPU).

BACKGROUND ART

Flash memory is non-volatile storage device in which data is maintained even when power is removed. It is a technology that is primarily used in portable devices, such as digital cameras, MP3 players, mobile phones, and USB drives, for storage of a large capacity of information. Types of flash memory include NAND types for data storage and NOR types for code storage according to the shape of an electronic circuit inside a semiconductor chip.

In NAND flash memory, cells as storage units are arranged in a vertical direction, and many cells can be made in a narrow space so that a large capacity of information can be stored in NAND flash memory. On the other hand, in NOR flash memory, cells as storage units are arranged in a horizontal direction, and the capacity of data storage is small, and a read speed is fast. Thus, NOR flash memory is primarily used to store core data based on action like in mobile phones. NOR flash memory includes independent address spaces like other memory, and addresses and data buses exist in NOR flash memory to correspond to respective, independent address spaces. Thus, in NOR flash memory, interface with a CPU can be easily performed. However, in NAND flash memory, addresses and data buses use a common bus, and NAND flash memory does not include independent address spaces. Thus, a hardware control logic for solving the problem is needed. In addition, in order to drive a NAND flash memory system, a buffer may be necessarily installed in the hardware control logic.

FIGS. 1 and 2 illustrate the connection relationship between a plurality of conventional NAND flash arrays including data buses containing 8 bits (i.e., the number of input/output (I/O) buses is eight) and data buses containing 16 bits (i.e., the number of I/O buses is sixteen) and a conventional apparatus for controlling the NAND flash arrays.

Conventional NAND flash memory includes 8-bit or 16-bit data I/O buses $I/O_0$ to $I/O_7$ or $I/O_0$ to $I/O_{15}$. NAND flash memory uses chip enable (CE) signals, command latch enable (CLE) signals, address latch enable (ALE) signals, read enable (RE) signals, and write enable (WE) signals as control input signals for controlling NAND flash memory, and uses ready and busy (R/B) signals as control output signals. In this case, when a NAND flash array includes a plurality of NAND flash, control signals needed are a plurality of CE signals $CE_0$ to $CE_n$, a plurality of R/B signals $R/B_0$ to $R/B_n$, and common signals CLE/ALE/WE/RE. Thus, as illustrated in FIG. 1, when data I/O buses contain 8 bits, the CLE signals, the ALE signals, the RE signals, and the WE signals are input to each NAND flash memory through a common bus, and the CE signals and the R/B signals are input to each NAND flash memory through respective independent buses. In addition, as illustrated in FIG. 2, when data I/O buses contain 16 bits, 16-bit data buses are constituted by making two NAND flash having 8-bit data buses as a pair.

As described above, the apparatus for controlling NAND flash having the connection relationship with NAND flash memory reads or writes data stored in NAND flash memory through data I/O buses by generating control input signals. In the conventional apparatus for controlling NAND flash, the CPU controls a NAND flash controller in the format of previously-defined commands, and the conventional apparatus for controlling NAND flash controls NAND flash memory by generating NAND flash interface signals. In this case, commands that are previously defined for the CPU to control the NAND flash controller include READ commands, WRITE commands, ERASE commands, INVALID CHECK commands, and WRITE INVALID commands.

In addition, in the conventional apparatus for controlling NAND flash, interface between NAND flash memory including control lines and I/O signal lines and a host processor is constituted by performing the following operations. First, the apparatus for controlling NAND flash receives commands for controlling the operation of flash memory and operation information needed to perform the operation of the commands from the host processor. Next, the apparatus for controlling NAND flash decodes the received commands and operation information and then controls the control lines and the I/O signal lines so that an operation according to the decoded commands can be performed.

However, the conventional control method supports only several limited commands. Thus, there is a limitation in effectively controlling conventional, various types NAND flash. When considering that conventional NAND flash supports a unique operation of NAND flash manufactured by each manufacturer (for example, copy-back program, two-plane page read, cash read), it is difficult to perform an appropriate operation corresponding to NAND flash memory according to various manufacturers. Furthermore, a probability for supporting the unique operation of NAND flash to be newly provided in future is reduced.

DISCLOSURE OF THE INVENTION

The present invention provides an apparatus for controlling NAND flash memory which can be applied to NAND flash memory having unique operation characteristics according to each manufacturer by actively generating various commands and in which time required to control NAND flash memory can be reduced and the capacity of memory needed to control NAND flash memory can be effectively used.

According to an aspect of the present invention, there is provided an apparatus for controlling NAND flash memory, the apparatus including: a register unit in which a start address of a macro-command to be executed, selected from macro-commands included in a command script in which at least one macro-command in which a plurality of micro-commands for controlling a unit operation of NAND flash memory are arranged in an array shape, is described, is recorded; a command fetch unit, if a start address of the macro-command to be executed is recorded in the register unit, accessing first memory connected based on the start address of the macro-command to be executed and sequentially reading the plurality of micro-commands from the start address of the macro-command to be executed; a command interpretation unit interpreting the read micro-commands and outputting the result of interpretation including types of the micro-commands and command parameters; and a command execution unit generating interface signals for controlling an operation of NAND flash memory according to each of the micro-commands based on the result of interpretation.

According to another aspect of the present invention, there is provided an apparatus for controlling NAND flash memory, the apparatus including: a register unit in which a start address of a macro-command array to be executed, selected from a plurality of macro-command arrays included in a command script in which at least one macro-command array in which start addresses of a macro-command in which a plurality of micro-commands for controlling a unit operation of NAND flash memory are arranged in an array shape, are arranged in an array shape, is described, is recorded; a command fetch unit, if the start address of the macro-command array to be executed is recorded in the register unit, accessing first memory connected based on the start address of the macro-command array to be executed, sequentially reading start addresses of the macro-command from the start address of the macro-command array to be executed, and sequentially reading the plurality of micro-commands that constitute each macro-command from the first memory based on the start address of each macro-command; a command interpretation unit interpreting the read micro-commands and outputting the result of interpretation including types of the micro-commands and command parameters; and a command execution unit generating interface signals for controlling an operation of NAND flash memory according to each of the micro-commands based on the result of interpretation.

BRIEF DESCRIPTION OF THE DRAWINGS

The above and other aspects of the present invention will become more apparent by describing in detail exemplary embodiments thereof with reference to the attached drawings in which.

BEST MODE FOR CARRYING OUT THE INVENTION

The present invention will now be described more fully with reference to the accompanying drawings, in which exemplary embodiments of the invention are shown.

Figure 1:
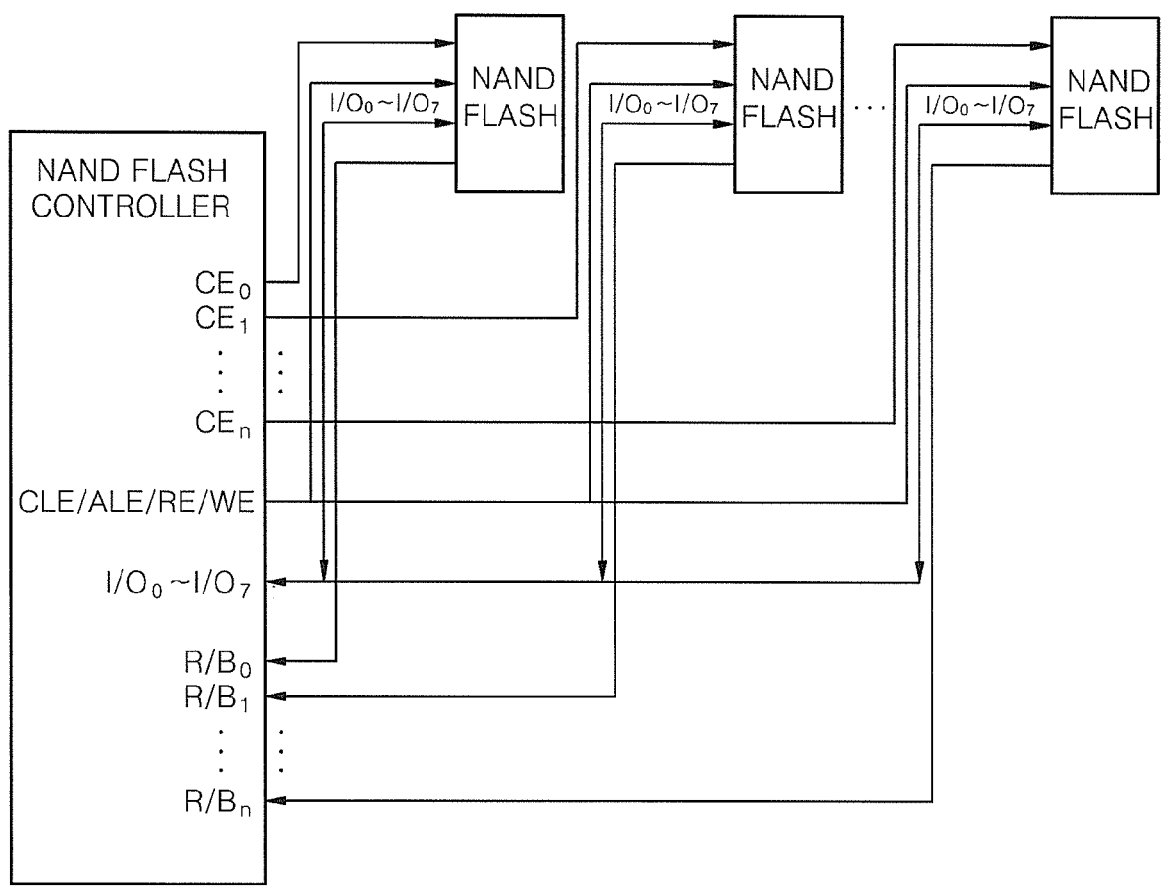
FIGS. 1 and 2 illustrate the connection relationship between a plurality of conventional NAND flash arrays including data buses containing 8 bits and data buses containing 16 bits and a conventional apparatus for controlling the NAND flash arrays.
Figure 2:
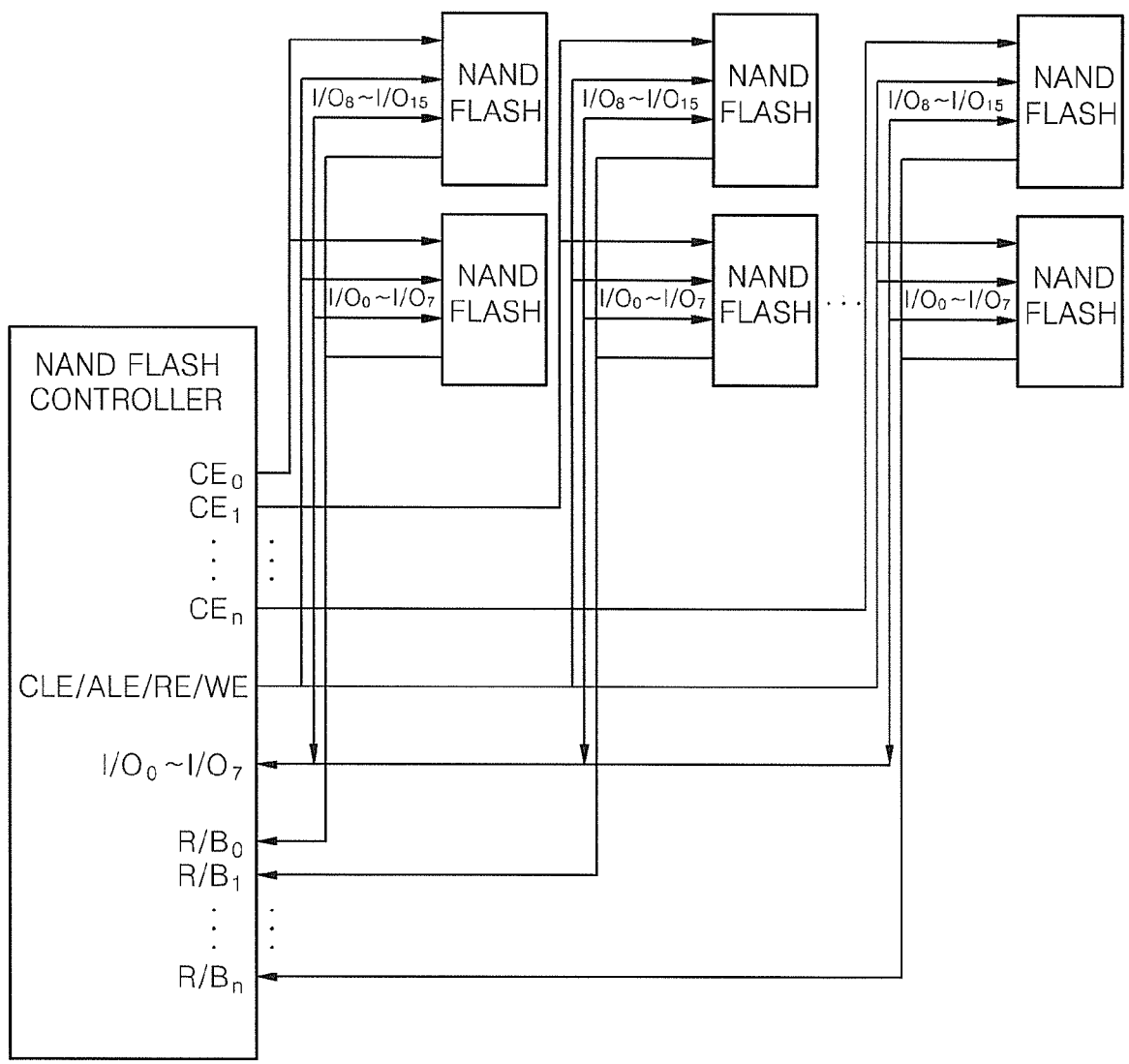
Figure 3:
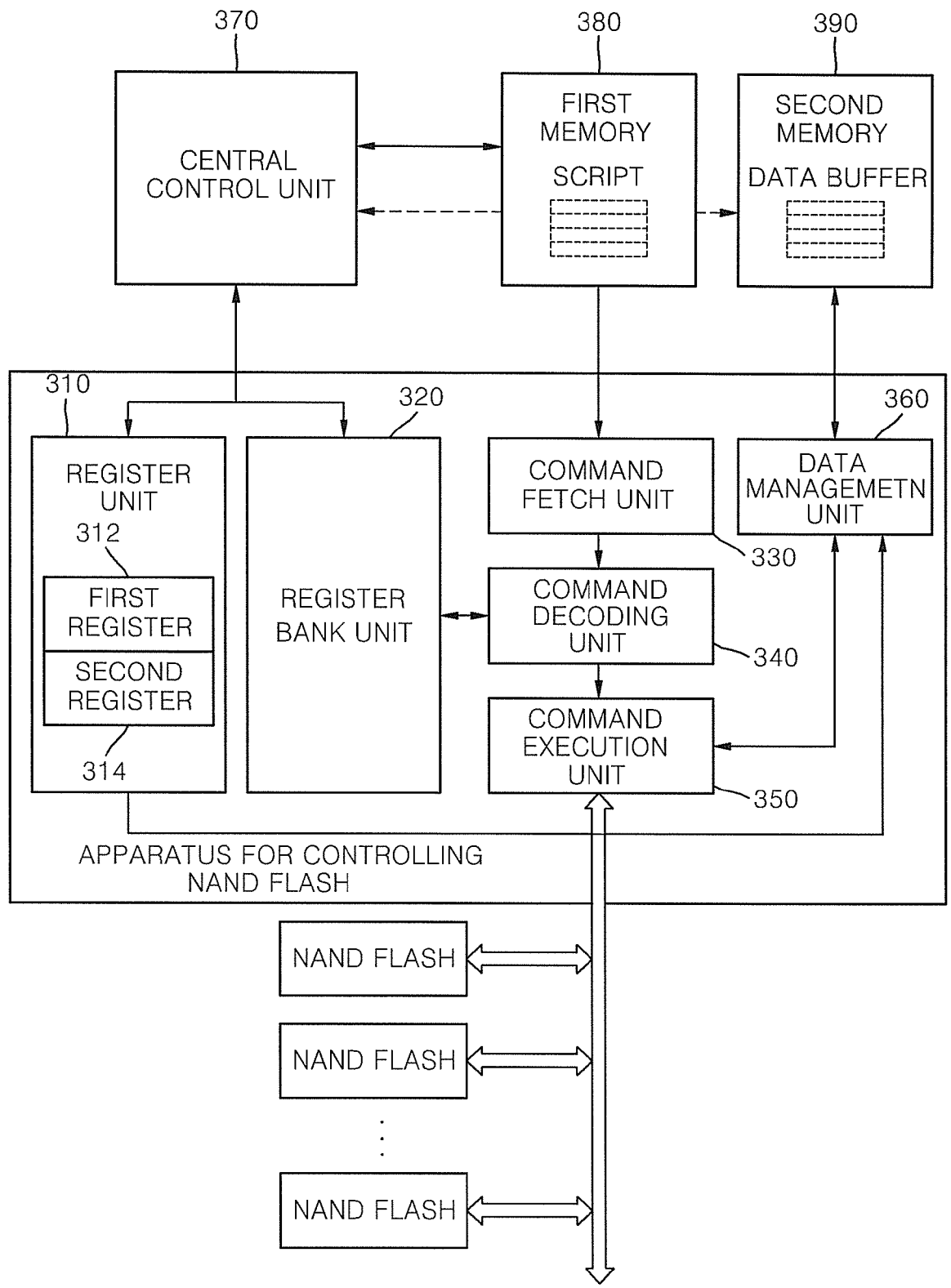
FIG. 3 illustrates an apparatus for controlling NAND flash memory according to an embodiment.

FIG. 3 illustrates an apparatus for controlling NAND flash memory according to an embodiment.

Referring to FIG. 3, the apparatus for controlling NAND flash memory according to the current embodiment includes a register unit 310, a register bank unit 320, a command fetch unit 330, a command interpretation unit 340, a command execution unit 350, and a data management unit 360.

The register unit 310 includes a first register 312 in which a start address of a macro-command selected from macro-commands included in a command script is recorded, and a second register 314 in which a start address of data is recorded. In this case, the start address of the macro-command is the same as an address of a first micro-command among micro-commands that constitute a corresponding macro-command. The macro-command is a command array including micro-commands that are a plurality of commands for controlling NAND flash memory. The micro-command expresses the operation of NAND flash memory in the smallest unit. One array is constituted by combining the micro-commands so that a macro-command can be defined. Therefore, one macro-command expresses more various operations of NAND flash memory. A last micro-command of each macro-command is an 'END' command that indicates an end of the macro-command.

Figure 4:
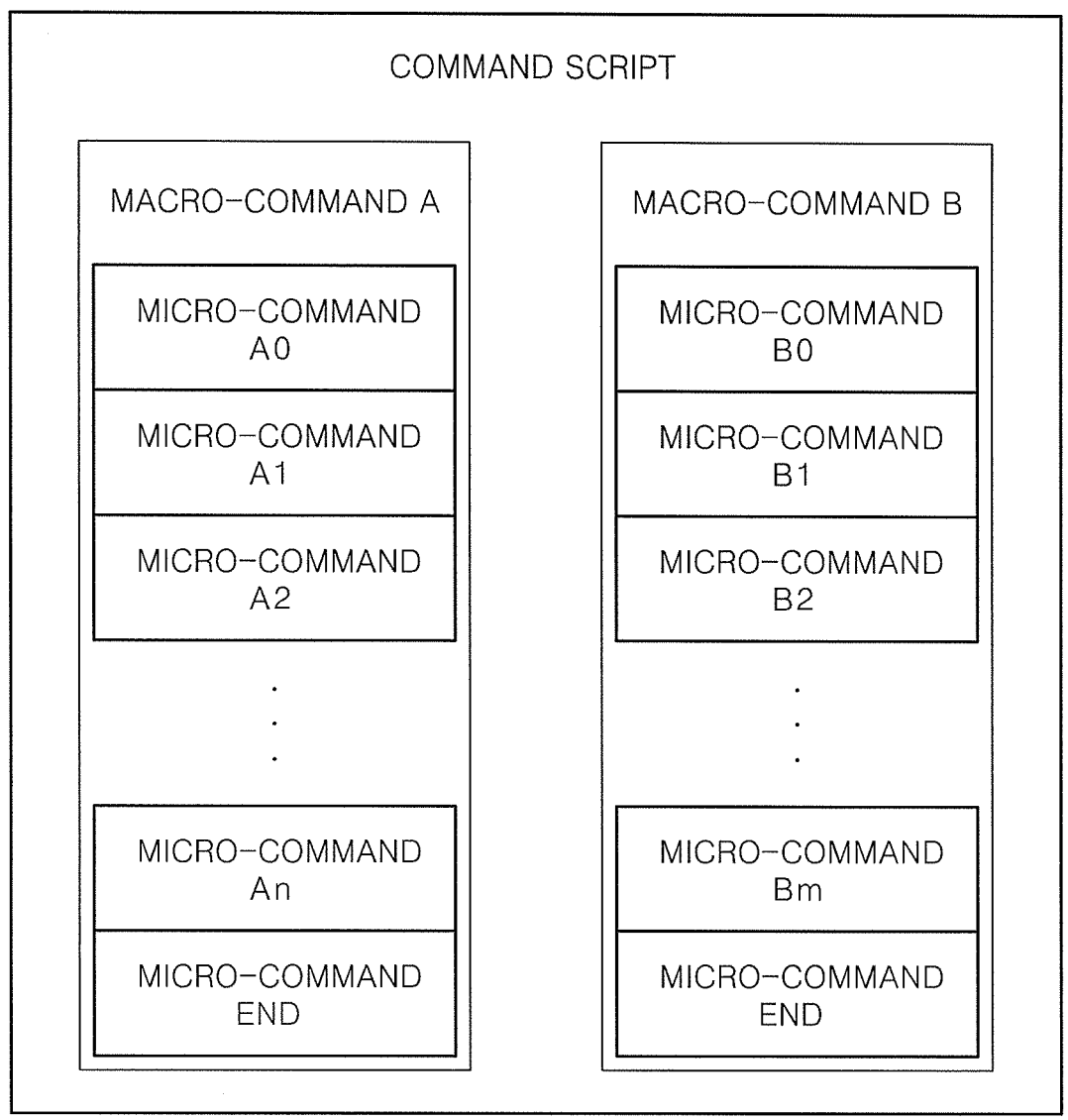
FIG. 4 illustrates an example of a command script containing a plurality of macro-commands.

FIG. 4 illustrates an example of a command script containing a plurality of macro-commands. The command script includes a plurality of arrays of a series of commands and a plurality of address pointer arrays. Each of the commands has a fixed or variable size. A central control unit 370 selects a macro-command to be executed, from one or more macro-commands stored in first memory 380 and records a start address (i.e., a physical address of a storage place in the first memory 380 in which one or more macro-commands are stored) of the selected macro-command in the first register 312. In addition, the central control unit 370 selects data corresponding to a control command from a plurality of pieces of data stored in second memory 390 and records a start address (i.e., a physical address of a storage place in the second memory 390 in which first data of the data corresponding to the control command to be executed is stored) of the selected data in the second register 314. The first memory 380 and the second memory 390 include static random access memory (SRAM), dynamic RAM (DRAM), read only memory (ROM), a register array, etc. The command script is dynamically described in the first memory 380 by the central control unit 370, a digital signal processor or an apparatus corresponding to the central control unit 370 or the digital signal processor, or statically described in the first memory 380 which is ROM in advance.

The register bank unit 320 includes a plurality of register arrays, and values of micro-command parameters to be described later are recorded in each register. The register bank unit 320 is selectively provided. When the apparatus for controlling NAND flash memory includes the register bank unit 320, the register bank unit 320 may perform several operations by using one script so that the capacity of the first memory 380 in which the script is stored can be effectively used. As an example, when '0x30' is output to an input/output (I/O) bus and a singe write command is executed on NAND flash memory, command parameters recorded in the command script vary according to provision of the register bank unit 320. In other words, when the apparatus for controlling NAND flash memory does not include the register bank unit 320, a single write command recorded in the command script is expressed as WRS(0x30)', and the command execution unit 350 outputs write enable (WE) signals and read enable (RE) signals in the format of 'High->Low->High' and outputs '0x30' to the I/O bus. Unlike this, when the apparatus for controlling NAND flash memory includes the register bank unit 320, the single write command recorded in the command script is expressed as 'WRS(IR$_0$)'. In this case, the command execution unit 350 outputs a value (i.e., '0x30') stored in a first register of the register bank unit 320 to the I/O bus. By employing the register bank unit 320, several operations can be performed by using the same command script only by varying a value recorded in each register. As such, the capacity of the first memory 370 in which the command script is stored can be effectively used.

Meanwhile, the register bank unit 320 may be used as a temporary storage device. In other words, when the size of data is small like in single read and single write, it is more effective to use the register of the register bank unit 320 of the apparatus for controlling NAND flash memory rather than to bring data from the second memory 390 or to record data in the second memory 290 by accessing the second memory 390. When the register bank unit 320 is used as a temporary storage device, the data management unit 360 performs only operations related to multiple read and multiple read.

The command fetch unit 330 reads each of the micro-commands from the first memory 380 based on the start address of the macro-command, which is recorded by the central control unit 370, in the first register 312. In this case, the command fetch unit 330 sequentially reads the micro-commands from the first memory 380 by increasing the start address of the macro-command recorded in the first register 312 of the register unit 310 until the command fetch unit 330 reads a macro-command corresponding to 'END'.

The command interpretation unit 340 recognizes and classifies the micro-commands that are read by the command fetch unit 330 from the first memory 380. In addition, the command interpretation unit 340 provides types of micro-commands, command parameters, and operation parameters which are the result of interpretation of the micro-commands, to the command execution unit 350 so that the command execution unit 350 can perform an operation corresponding to each of the micro-commands. In this case, when the apparatus for controlling NAND flash memory includes the register bank unit 320, the command interpretation unit 340 reads a value recorded in a register corresponding to the number of registers defined due to the command parameters and provides the read value to the command execution unit 350.

The command execution unit 350 generates NAND interface signals corresponding to each of the micro-commands that are input from the command interpretation unit 340. The micro-commands used in the present invention include single read RDS, single write WRS, multiple read RDM, multiple write WRM, chip enable (CE), state check RB, wait WAIT, and end END. FIGS. 5A through 5E are flowcharts illustrating an operation of generating NAND interface signals of the command execution unit 350 corresponding to each of the micro-commands.

Figure 5A:
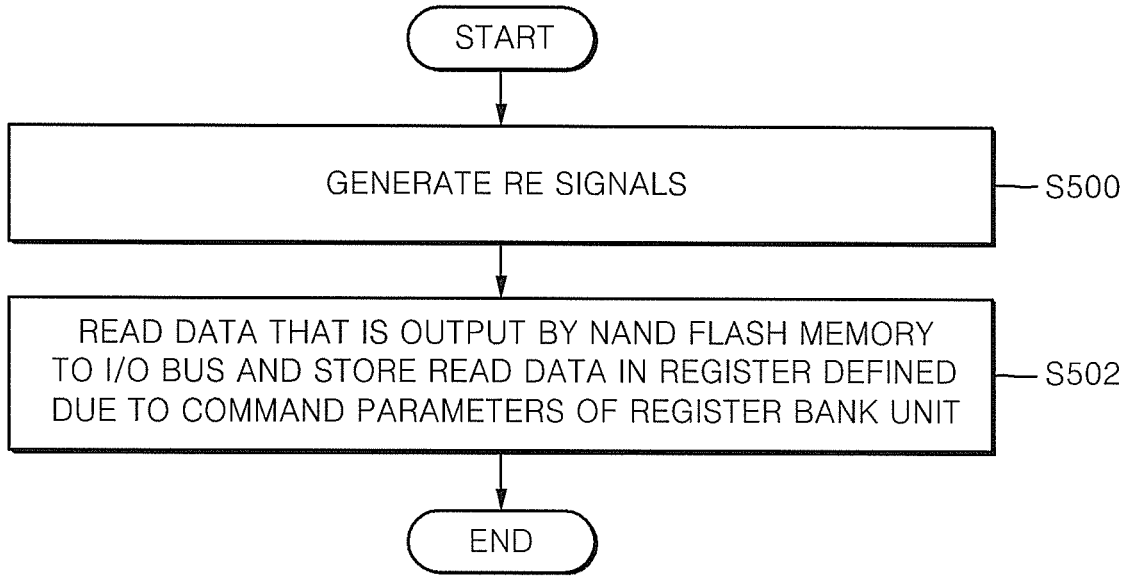
FIGS. 5A through 5E are flowcharts illustrating an operation of generating NAND interface signals of a command execution unit corresponding to each of micro-commands.

FIG. 5A is a flowchart illustrating an operation of generating NAND interface signals of the command execution unit 350 when the input micro-command is RDS. Referring to FIG. 5A, in operation S500, the command execution unit 350 generates read enable (RE) signals. In this case, the RE signals are output in the format of High->Low->High. Next, in operation S502, the command execution unit 350 reads data that is output by NAND flash memory to the I/O bus and stores the read data in a defined register of the register bank unit 320. A register is defined due to command parameters of the RE signals. When the above operation is completed, a single read operation is terminated.

Figure 5B:
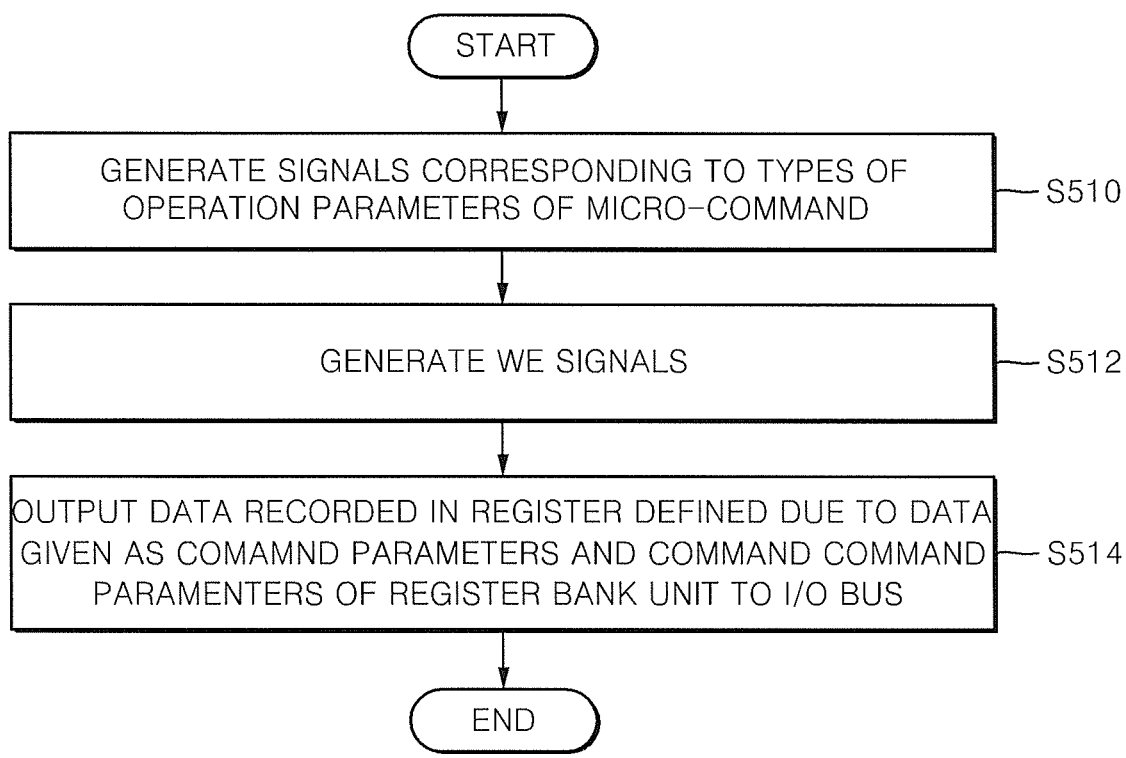

FIG. 5B is a flowchart illustrating an operation of generating NAND interface signals of the command execution unit 350 when the input micro-command is WRS. Referring to FIG. 5B, in operation S510, the command execution unit 350 generates signals corresponding to types of operation parameters of the micro-command. The operation parameters defined for the micro-command WRS are command latch enable (CLE) signals and address latch enable (ALE) signals. Next, in operation S512, the command execution unit 350 generates write enable (WE) signals. In this case, the WE signals are output in the format of High->Low->High. Next, in operation S514, the command execution unit 350 outputs data given as command parameters of the WE signals or data recorded in a corresponding register of the register bank unit 320 defined due to the command parameters of the WE signals to the I/O bus. When the above operation is completed, a single write operation is terminated.

Figure 5C:
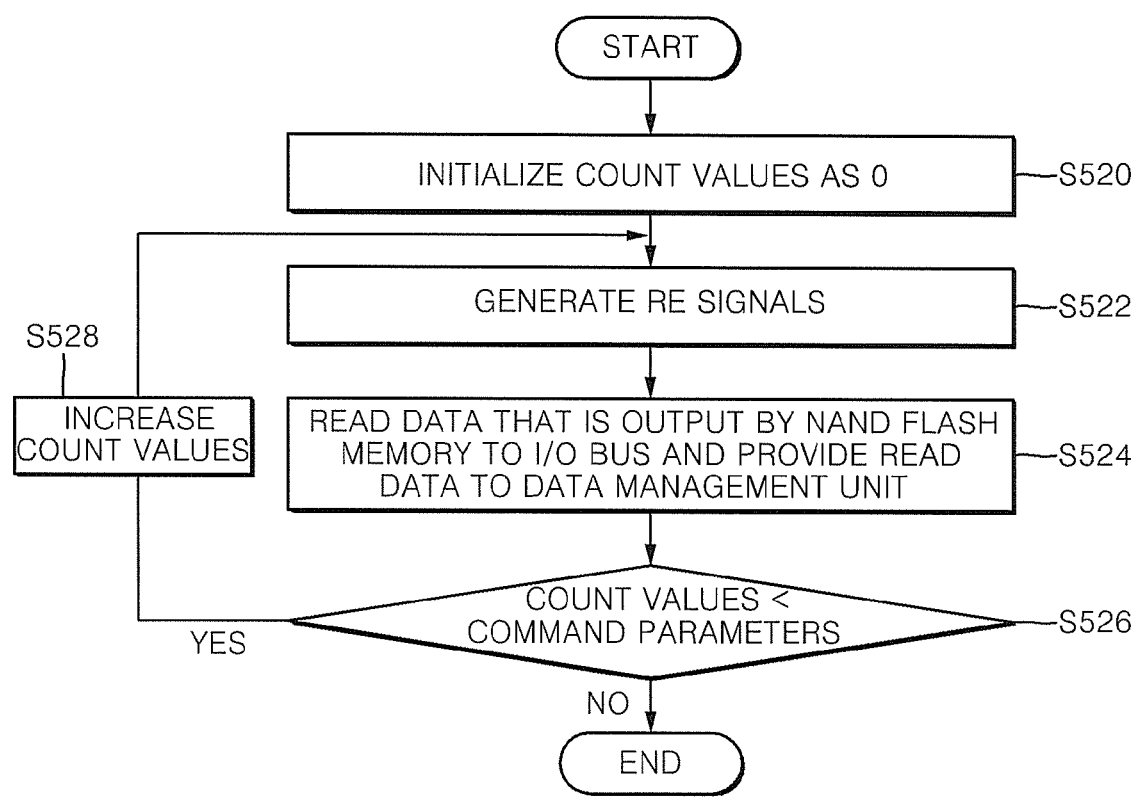

FIG. 5C is a flowchart illustrating an operation of generating NAND interface signals of the command execution unit 350 when the input micro-command is RDM. The micro-command RDM is a command that repeats single read by a number of times corresponding to command parameters of the micro-command. Referring to FIG. 5C, the command execution unit 350 initializes count values as 0. Next, in operation S522, the command execution unit 350 generates RE signals. Next, in operation S524, the command execution unit 350 reads data that is output by NAND flash memory to the I/O bus and provides the read data to the data management unit 360. Next, in operation S526, the command execution unit 350 checks whether the count values are smaller than the command parameters. In operation S528, if the count values are smaller than the command parameters, the command execution unit 350 increases the count values and performs operation S522. Unlike this, if the count values are the same as or larger than the command parameters, a multiple read operation is terminated. The data management unit 360 records each of a piece of data provided by the command execution unit 350 sequentially from a storage space of the second memory 390 corresponding to a data start address recorded in the second register 314. If a command parameter of RDM is '0x01' (i.e., the command parameter of RDM is defined to perform only single read once), substantially the same operation as RDS is performed. The only difference between RDM and RDS is that, in RDM, a data storage space and a data storing object are the second memory 390 and the data management unit 360, respectively, and in RDS, a data storage space and a data storing objet are a register that is defined due to command parameters of the register bank unit 320, and the command execution unit 350, respectively.

Figure 5D:
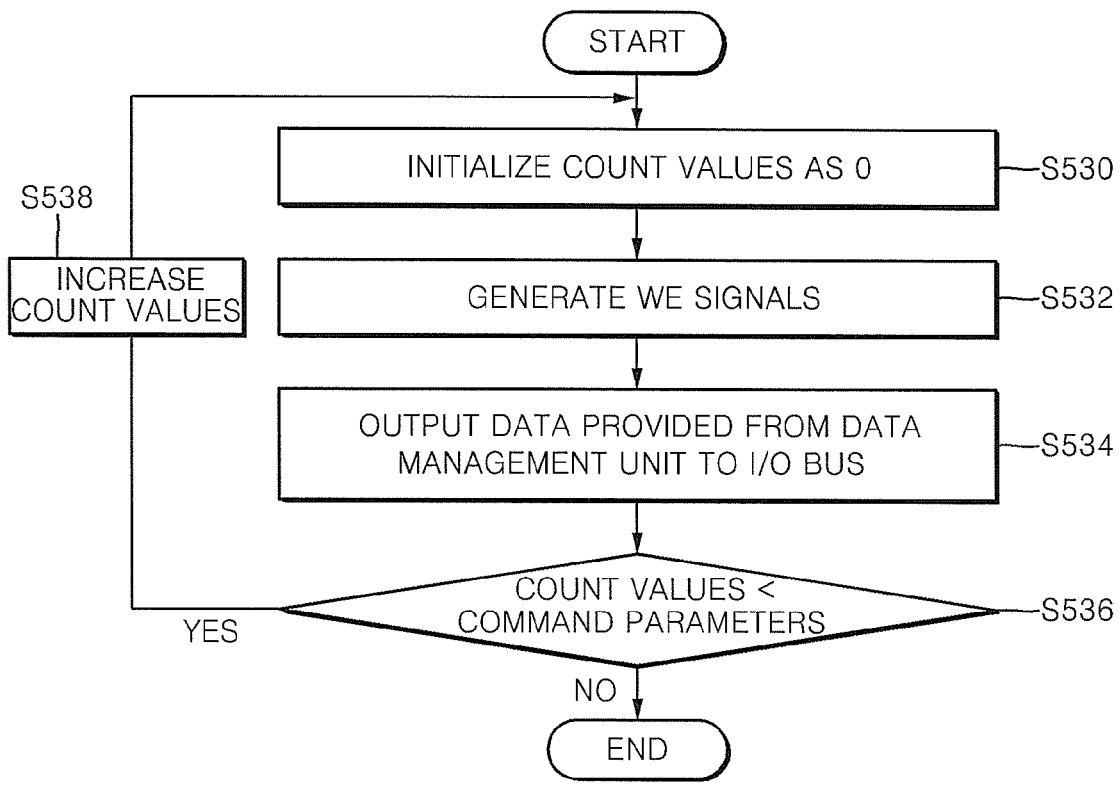

FIG. 5D is a flowchart illustrating an operation of generating NAND interface signals of the command execution unit 350 when the input micro-command is WDM. The micro-command WDM is a command that repeats single write by a number of times corresponding to command parameters of the micro-command. Referring to FIG. 5D, in operation S530, the command execution unit 350 initializes count values as 0. Next, in operation S532, the command execution unit 350 generates WE signals. Next, in operation S534, the command execution unit 350 outputs data that is provided by the data management unit 360, to the I/O bus. Next, in operation S536, the command execution unit 350 checks whether the count values are smaller than the command parameters. In operation S538, if the count values are smaller than the command parameters, the command execution unit 350 increases the count values and performs operation S532. Unlike this, if the count values are the same as or larger than the command parameters, a multiple write operation is terminated. In this case, the data management unit 360 sequentially reads a plurality of pieces of data from a storage space of the second memory 390 corresponding to a data start address recorded in the second register 314 and provides the read pieces of data to the command execution unit 350. If a command parameter of WRM is '0x01' (i.e., the command parameter of WRM is defined to perform only single write once), substantially the same operation as WRS is performed. The only difference between WRM and WRS is that, in WRM, a data storage space and a data reading object are the second memory 390 and the data management unit 360, respectively, and in WRS, a data storage space and a data reading objet are a register that is defined due to command parameters of the register bank unit 320, and the command execution unit 350, respectively.

Figure 5E:
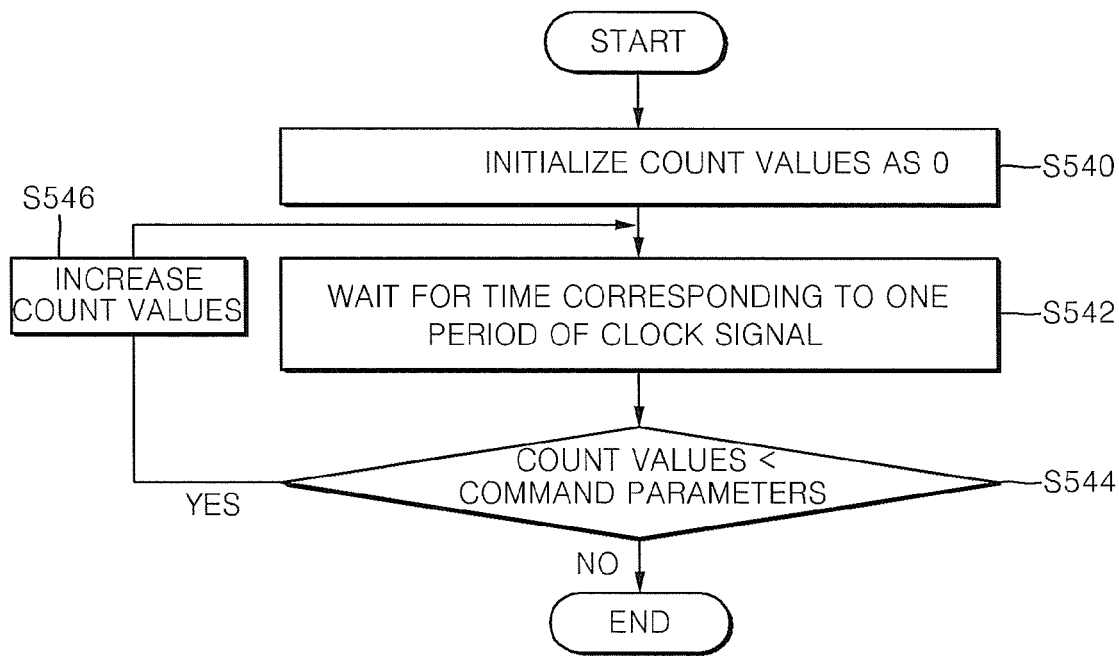

FIG. 5E is a flowchart illustrating an operation of generating NAND interface signals of the command execution unit 350 when the input micro-command is WAIT. Referring to FIG. 5E, in operation S540, the command execution unit 350 initializes count values as 0. Next, in operation S542, the command execution unit 350 waits for a predetermined amount of time corresponding to one period of a clock signal. Next, in operation S544, the command execution unit 350 checks whether the count values are smaller than the command parameters. In operation S546, if the count values are smaller than the command parameters, the command execution unit 350 increases the count values and performs operation S542. Unlike this, if the count values are the same as or larger than the command parameters, a wait operation is terminated.

Meanwhile, when the input micro-command is CE, the command execution unit 350 generates a CE signal $CE_n$ that allows a NAND flash memory chip corresponding to a number defined due to command parameters of the micro-command to be selected. In this case, the CE signal is output in the format of High or Low. In addition, when the input micro-command is RB, the command execution unit 350 waits until the RB signal output from the NAND flash memory chip corresponding to a number defined due to command parameters of the micro-command becomes High or Low.

The following Table 1 shows examples of micro-commands, formats of is micro-commands, and operations according to the micro-commands, which are used in the apparatus for controlling NAND flash memory according to the present invention.

TABLE 1

| Command code | Command parameter ([ ]: operation parameter) | Format | Description |
| --- | --- | --- | --- |
| RDS | IRn: n-th register of register bank | RDS(IRn) | * Single read<br>RE signal is output as HIGH->LOW->HIGH, and NAND flash memory reads data output to I/O bus and stores read data in register defined due to command parameters of register bank. |
| WRS | [CLE/ALE]<br>CLE: CLE activation<br>ALE: ALE activation<br>IMM/IRn<br>IMM: IMM value is loaded on I/O bus<br>IRn: value stored in n-th register of register bank is loaded on I/O bus | WRS(IMM/IRn, [CLE/ALE]) | * Single write<br>WE signal is output as HIGH->LOW->HIGH, and IMM value or data stored in register defined due to command parameters of register bank is output to I/O bus. |
| RDM | IMM: number of times of read | RDM(IMM) | * Multiple read<br>Singe read operation of number of times indicated by IMM is repeatedly performed, and NAND flash memory stores data output to I/O bus. |
| WRM | IMM: number of times of write | WRM(IMM) | *Multiple write<br>Single write operation of number of times indicated by IMM is repeatedly performed, and NAND flash memory outputs data read from second memory to I/O bus. |
| CE | IMM/IRn<br>IMM: number of NAND flash selected from NAND flash arrays<br>IRn: register information of register bank unit in which number of NAND flash selected from NAND flash arrays is stored<br>HIGH/LOW<br>HIGH: chip enable signal of NAND flash corresponding to number defined due to command parameters is output as LOW. | CE(IMM/IRn, HIGH/LOW) | * Chip set control<br>Chip enable signal of NAND flash indicated by IMM or value stored in IRn is output as HIGH or LOW. |
| RB | IMM/IRn<br>IMM: number of RB signal of NAND flash selected from NAND flash arrays<br>IRn: register information of register bank unit in which number of RB signal of NAND flash selected from NAND flash arrays is stored<br>HIGH/LOW<br>HIGH: HIGH state of selected RB signal<br>LOW: LOW state of selected RB signal | RB(IMM/IRn, HIGH/LOW) | * State check<br>State check of Read/Busy signal. Wait until RB signal of NAND flash indicated by IMM or value stored in IRn becomes HIGH or LOW. |

TABLE 1-continued

| Command code | Command parameter ([ ]: operation parameter) | Format | Description |
|---|---|---|---|
| WAIT | IMM: number of times of internal clocks | WAIT(IMM) | * Wait<br>Wait by number of times of internal clocks indicated by IMM |
| END | — | END | * Script end<br>End script being performed. |

The data management unit 360 sequentially reads a plurality of pieces of data from the storage space of the second memory 390 corresponding to a data start address recorded in the second register 314 by a number defined due to command parameters of WRM and provides the read data to the command execution unit 350. In addition, the data management unit 360 receives the data ready from NAND flash memory through an I/O bus from the command execution unit 350 and sequentially records the pieces of data from the storage space of the second memory 390 corresponding to the data start address recorded in the second register 314.

Figure 6:
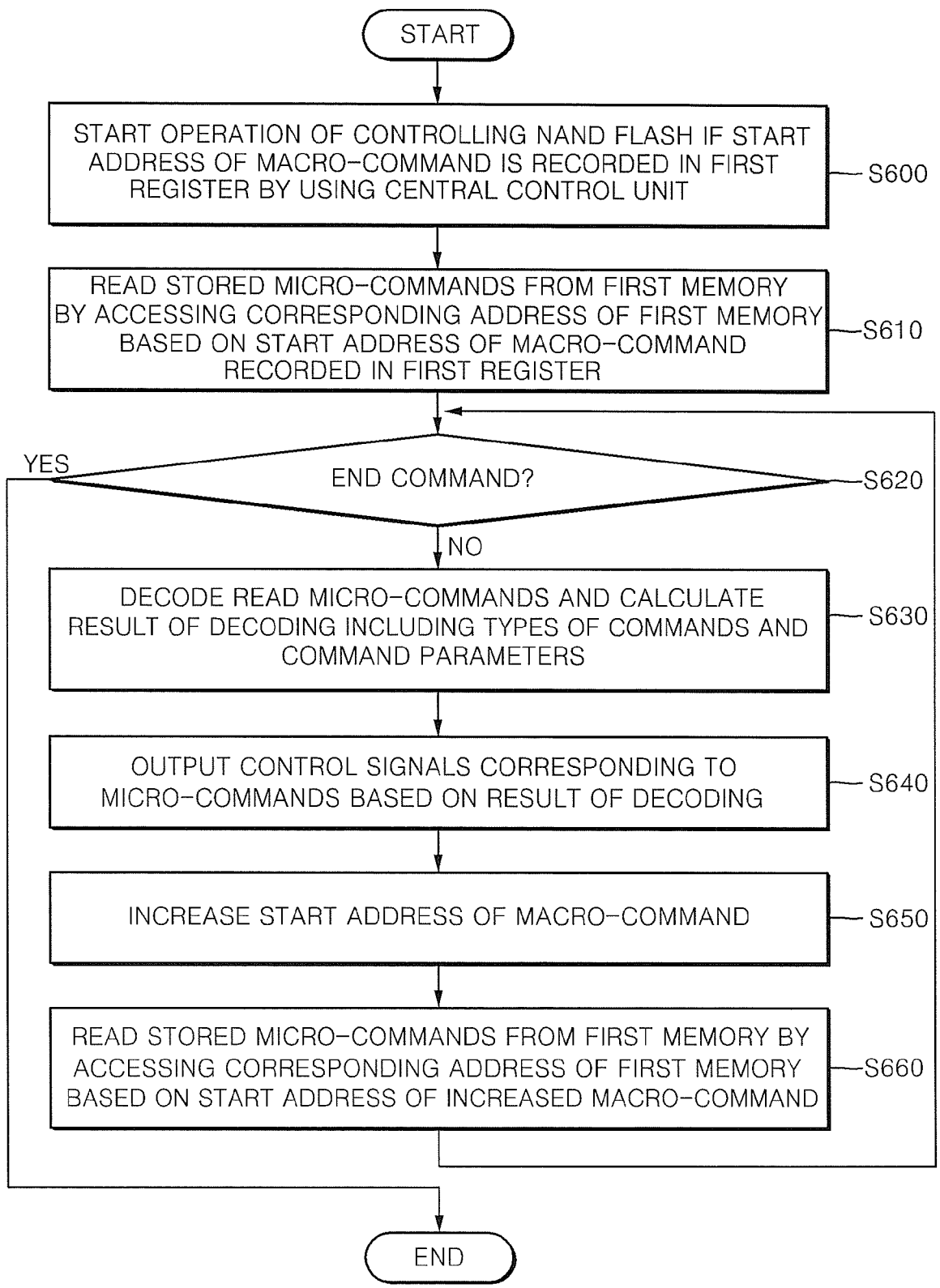
FIG. 6 is a flowchart illustrating an operation of controlling NAND flash memory performed by the apparatus for controlling NAND flash memory illustrated in FIG. 3, according to an embodiment.

FIG. 6 is a flowchart illustrating an operation of controlling NAND flash memory performed by the apparatus for controlling NAND flash memory illustrated in FIG. 3, according to an embodiment.

Referring to FIG. 6, in operation S600, if a start address of a macro-command selected by the central control unit 370 is recorded in the first register 312, the apparatus for controlling NAND flash memory starts an operation of controlling NAND flash memory. Next, in operation S610, the command fetch unit 330 reads subsequently a plurality of micro-commands from the first memory 380 by accessing a corresponding address of the first memory 380 based on the start address of the macro-command recorded in the first register 312. In this case, in operation S620, if any of the read micro-commands is an 'END' command, the operation of controlling NAND flash memory is terminated. Unlike this, in operation S630, if each of the micro-commands is not the 'END' command, the command fetch unit 330 provides the read micro-commands to the command interpretation unit 340, and the command interpretation unit 340 interprets the micro-commands and provides the results of interpretation including types of commands, command parameters, and operation parameters to the command execution unit 350. In operation S640, the command execution unit 350 outputs control signal corresponding to the micro-commands to the I/O bus based on the result of interpretation. In operation S650, when the operation of controlling the micro-commands that are read by the command fetch unit 330 from the first memory 380 is completed as above, the command fetch unit 330 increases a start address of the macro-command. In operation S660, the apparatus for controlling NAND flash memory accesses the corresponding address of the first memory 380 based on the start address of the increased macro-command after increasing the start address of the macro-command, to read the stored micro-commands from the first memory 380. Subsequently, the apparatus for controlling NAND flash memory performs operations S620 to S660 until the 'END' command is read.

The apparatus for controlling NAND flash memory illustrated in FIG. 3 controls NAND flash memory based on the command script having the structure illustrated in FIG. 4. In this case, the command script is stored in the first memory 380 by using the central control unit 370. Meanwhile, the apparatus for controlling NAND flash memory according to one or more embodiments may control NAND flash memory based on the command script having a multilayer structure. The connection relationship and operation of remaining elements of the apparatus for controlling NAND flash memory according to another embodiment are the same as those of the apparatus for controlling NAND flash memory illustrated in FIG. 3 except for a structure of a command script, data recorded in the first register 312 of the register unit 310 and the operation of the command fetch unit 330. Thus, the structure and operation of the apparatus for controlling NAND flash memory according to another embodiment will now be described.

Figure 7:
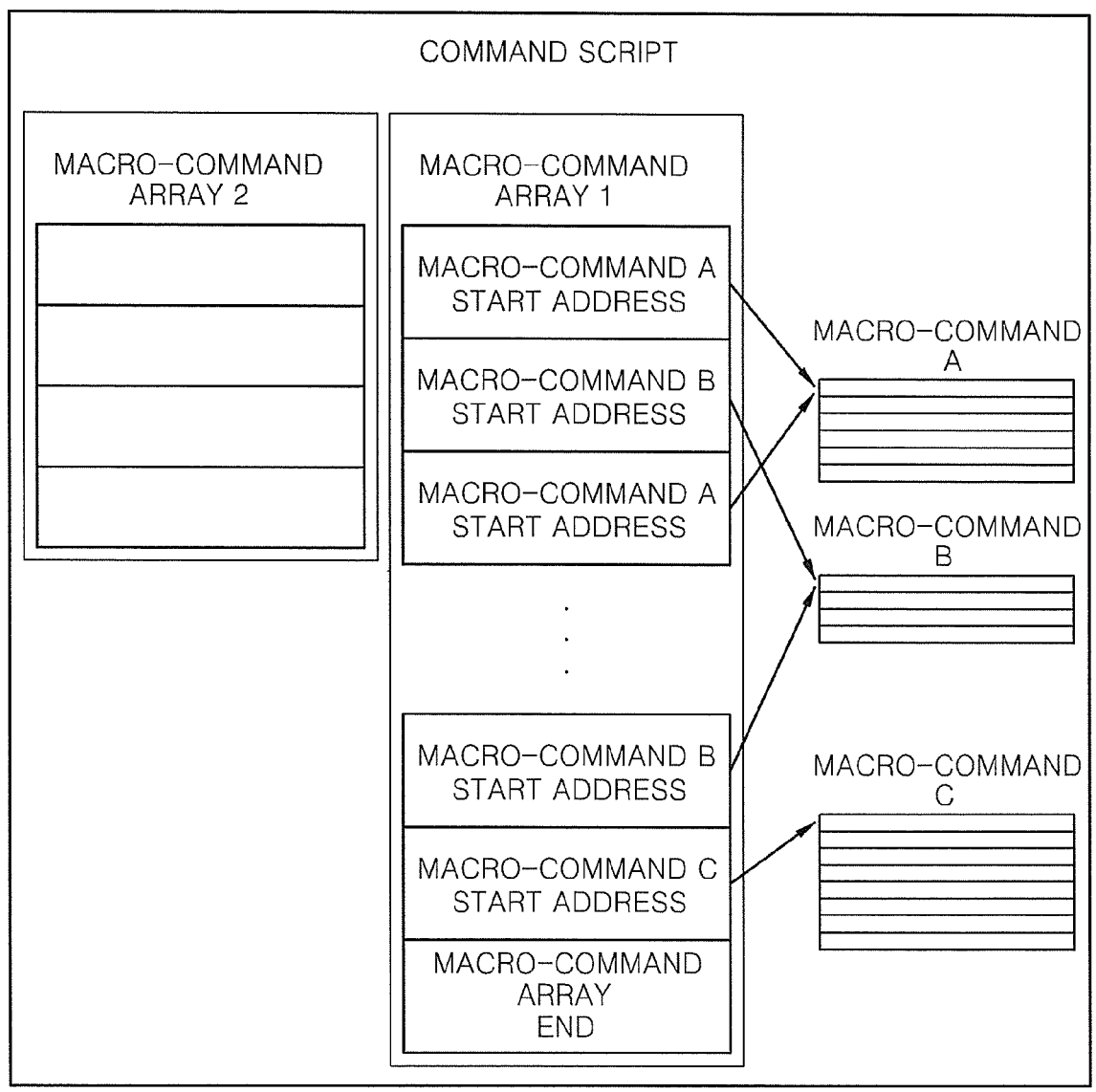
FIG. 7 illustrates a structure of a command script used in the apparatus for controlling NAND flash memory, according to another embodiment.

FIG. 7 illustrates a structure of a command script used in the apparatus for controlling NAND flash memory, according to another embodiment.

Referring to FIG. 7, the command script includes a plurality of macro-command arrays. Each of the macro-command arrays is an address column including start addresses of the plurality of macro-commands. An 'END' command that indicates an end of the macro-command arrays is recorded in the last of each of the macro-command arrays. In addition, each of the macro-commands is stored in a physical storage space of the first memory 380 corresponding to the start address of the macro-command that constitutes each of the macro-command arrays. In this case, each of the macro-commands includes a plurality of micro-commands.

Figure 8:
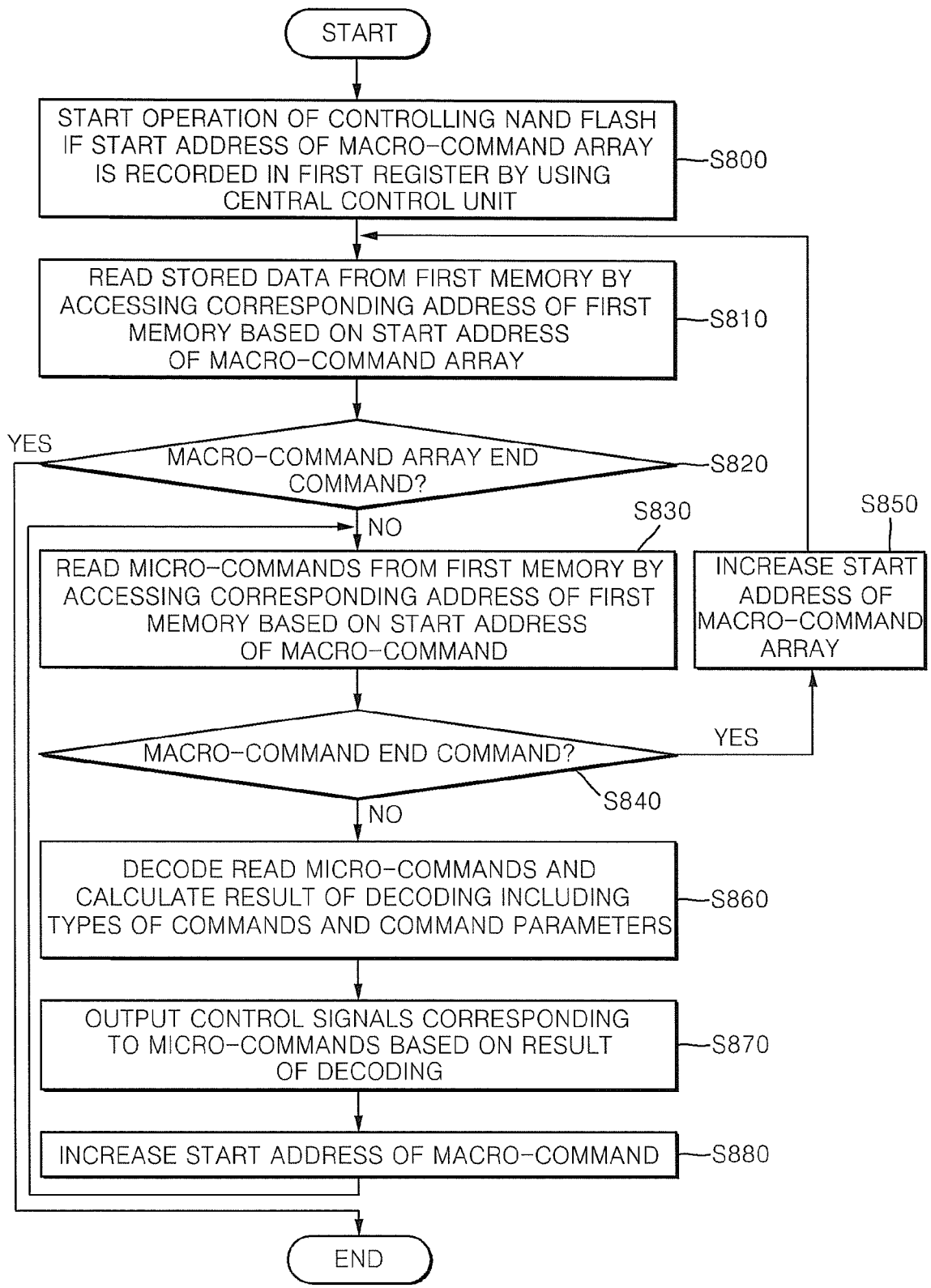
FIG. 8 is a flowchart illustrating an operation of controlling NAND flash memory performed by the apparatus for controlling NAND flash memory, according to another embodiment.

FIG. 8 is a flowchart illustrating an operation of controlling NAND flash memory performed by the apparatus for controlling NAND flash memory, according to another embodiment.

Referring to FIG. 8, when a start address of a macro-command array selected by the central control unit 370 is recorded in the first register 312, in operation S800, the apparatus for controlling NAND flash memory starts an operation of controlling NAND flash memory. Next, in operation S810, the command fetch unit 330 reads data from the first memory 380 by accessing a corresponding address of the first memory 380 based on the start address of the macro-command array recorded in the first register 312. In this case, in operation S820, if the read data is an 'END' command that indicates an end of the macro-command array, the operation of controlling NAND flash memory is terminated. Unlike this, in operation S830, if the read data is a start address of a macro-command, the command fetch unit 330 reads subsequently a plurality of micro-commands from the first memory 380 by accessing the corresponding address of the first memory 380 based on the start address of the read macro-command. In this case, in operation S840, if any of the read micro-commands is an 'END' command that indicates an end of the macro-command, in operation S850, the command fetch unit 330 increases the start address of the macro-command array.

Unlike this, in operation S860, if each of the read micro-commands is not the 'END' command that indicates an end of the macro-command, the command fetch unit 330 provides the read micro-commands to the command interpretation unit 340, and the command interpretation unit 340 interprets the micro-commands to provide the results of interpretation including types of commands, command parameters, and operation parameters to the command execution unit 350. In operation S870, the command execution unit 350 outputs control signals corresponding to the micro-commands to the I/O bus based on the result of interpretation. Next, in operation S880, the command fetch unit 330 increases the start address of the macro-command. Next, the command fetch unit 330 repeatedly performs operations S830 to S880 until the 'END' command indicating an end of the macro-command is read. Meanwhile, the command fetch unit 330 repeatedly performs operations S810 to S880 until the 'END' command indicating an end of the macro-command array is read after operation 840 is performed so as to increase the start address of the macro-command array.

As described above, the apparatus for controlling NAND flash memory according to another embodiment uses the macro-command array including a plurality of macro-commands including a micro-command array so that a plurality of control commands can be executed at one time by accessing a register once by using the central control unit 370. A series of macro-commands may express a more complicated operation of NAND flash memory. The repeated operations of NAND flash memory are expressed as one macro-command and are performed repeatedly in the macro-command array so that the capacity of memory in which the command script is stored can be effectively used.

Meanwhile, the apparatus for controlling NAND flash memory according to one or more embodiments may be implemented as a shape in which FIGS. 3 and 8 are combined. The connection relationship and operation of remaining elements of the apparatus for controlling NAND flash memory according to another embodiment are the same as those of the apparatus for controlling NAND flash memory illustrated in FIG. 3 except for a structure of a command script, configuration of the register unit 310 and the operation of the command fetch unit 330. More specifically, the apparatus for controlling NAND flash memory according to another embodiment includes at least three registers. In this case, a first register is used to control NNAND flash memory based on the command script including macro-commands, and a second register is used to control NAND flash memory based on a command script including command arrays, and a third register is used to store a start address of data. Thus, when the apparatus for controlling NAND flash memory controls NAND flash memory based on the command script including macro-commands, the central control unit 370 writes the start address of the macro-command in the first register, and when the apparatus for controlling NAND flash memory controls NAND flash memory based on the command script including a plurality of macro-command arrays, the central control unit 370 writes the start address of the macro-command array in the second register. In this case, the command fetch unit 330 selectively performs a command fetch operation of the first or second embodiment according to a data write space of the central control unit 370.

Figure 9:
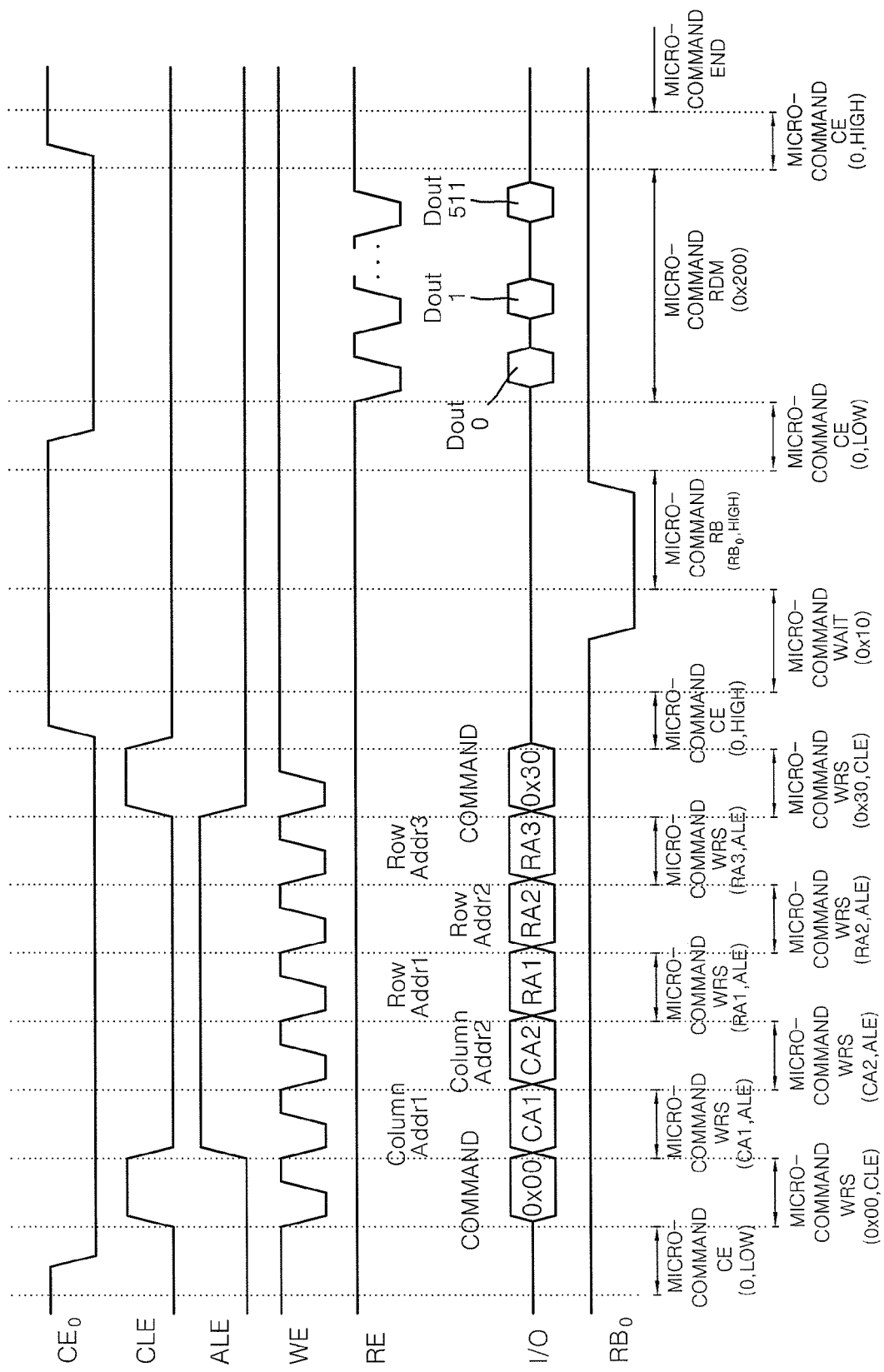
FIG. 9 illustrates control signals to be output so as to execute a read command on NAND flash memory, wherein the read command is executed by the apparatus for controlling NAND flash memory according to one or more embodiments.

FIG. 9 illustrates control signals to be output so as to execute a read command on NAND flash memory, wherein the read command is executed by the apparatus for controlling NAND flash memory according to one or more embodiments.

Referring to FIG. 9, a macro-command corresponding to a read command is includes fifteen micro-commands. A first micro-command is CE(0, LOW) which corresponds to a chip enable signal for selecting a zeroth NAND flash memory chip set. The apparatus for controlling NAND flash memory outputs 'LOW' through a signal line $CE_0$. A second micro-command is WRS(0x00, CLE) which corresponds to a single read command for activating CLE. The apparatus for controlling NAND flash memory outputs 'HIGH' through a control signal line CLE, outputs 'LOW->HIGH' through a control signal line WE, and outputs '0x00' to the I/O bus. Third through seventh micro-commands are WRS(address information, ALE) which corresponds to a single read command for activating ALE and for defining an address. For each of the third through seventh micro-commands, the apparatus for controlling NAND flash memory outputs 'HIGH' through a control signal line ALE, outputs 'LOW->HIGH' through the control signal line WE, and outputs 'address information' to the I/O bus. An eighth micro-command is WRS(0x30, CLE) which corresponds to a single write command for activating CLE. The apparatus for controlling NAND flash memory outputs 'HIGH' through the control signal line CLE, outputs 'LOW->HIGH' through the control signal line WE, and outputs '0x30' to the I/O bus. A ninth micro-command is CE(0, HIGH) which corresponds to a chip enable signal for selecting a zeroth NAND flash memory chip set. The apparatus for controlling NAND flash memory outputs 'HIGH' through the signal line $CE_0$.

A tenth micro-command is WAIT(0x10) which corresponds to a wait command for waiting for a predetermined amount of time. The apparatus for controlling NAND flash memory waits for internal clocks having the number corresponding to '0x10'. An eleventh micro-command is $RB(RB_0$, HIGH) which corresponds to a state check command for checking the state of NAND flash memory. The apparatus for controlling NAND flash memory monitors time when a state signal output from the zeroth NAND flash memory chip set becomes 'HIGH'. A twelfth micro-command is CE(0, LOW) which corresponds to a chip enable signal for selecting the zeroth NAND flash memory chip set. The apparatus for controlling NAND flash memory outputs 'LOW' through the signal line $CE_0$. A thirteenth micro-command is RDM (0x200) which corresponds to a multiple read command for executing a single read operation of 512 times. The apparatus for controlling NAND flash memory outputs 'LOW->HIGH' through a control signal line RE for each single read operation and outputs each data to the I/O bus. A fourteenth micro-command is CE(0, HIGH) which corresponds to a chip enable signal for selecting the zeroth NAND flash memory chip set. The apparatus for controlling NAND flash memory outputs 'HIGH' through the signal line $CE_0$. A fifteenth micro-command is END which corresponds to a command indicating an end of the macro-command. The apparatus for controlling NAND flash memory terminates the operation of controlling NAND flash memory.

Figure 10:
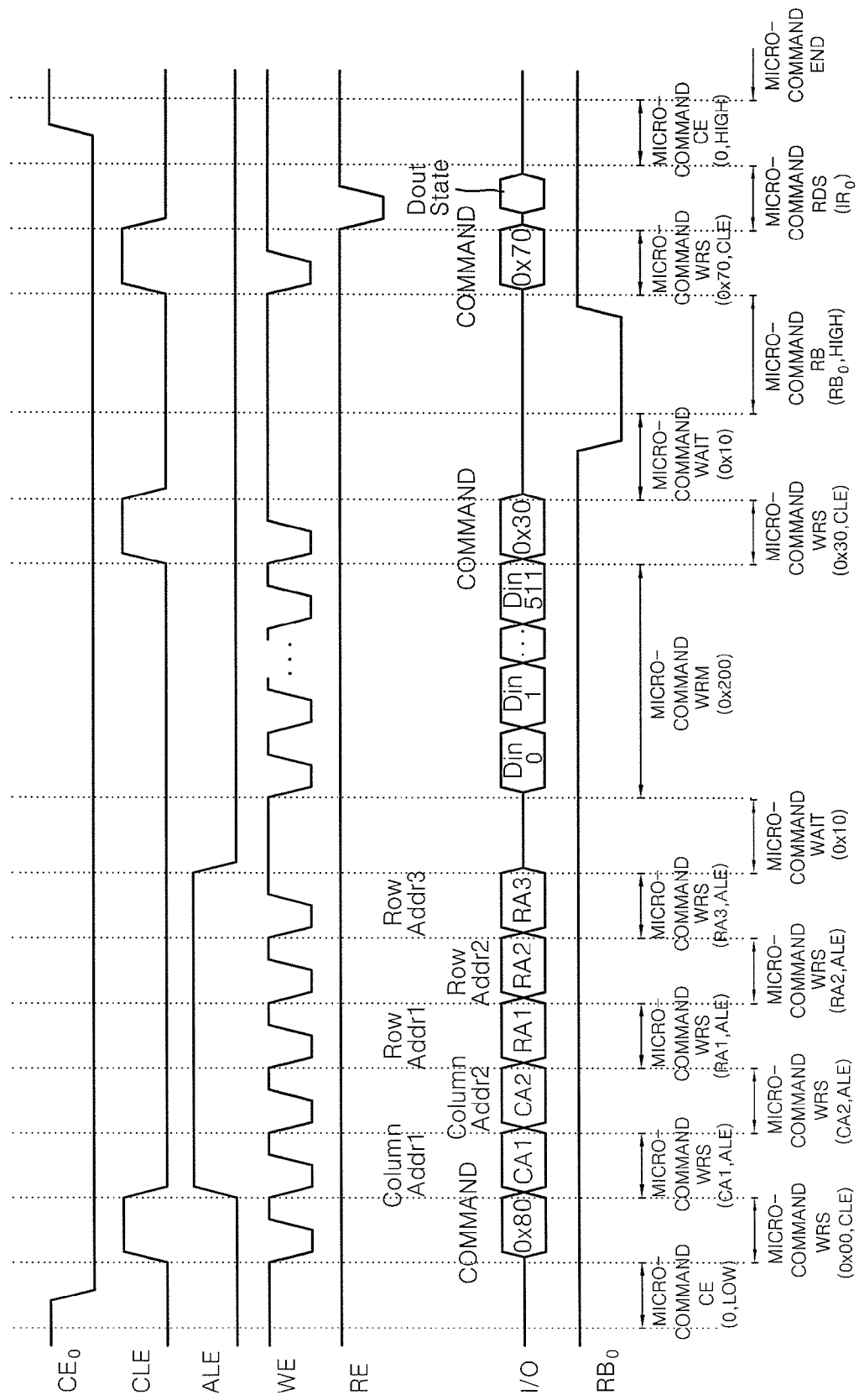
FIG. 10 illustrates control signals to be output so as to execute a write command on NAND flash memory, wherein the write command is executed by the apparatus for controlling NAND flash memory according to one or more embodiments.

FIG. 10 illustrates control signals to be output so as to execute a write command on NAND flash memory, wherein the write command is executed by the apparatus for controlling NAND flash memory according to one or more embodiments.

Referring to FIG. 10, a macro-command corresponding to a write command includes sixteen micro-commands. A first micro-command is CE(0, LOW) which corresponds to a chip enable signal for selecting a zeroth NAND flash memory chip set. The apparatus for controlling NAND flash memory outputs 'LOW' through a signal line $CE_0$. A second micro-command is WRS(0x80, CLE) which corresponds to a single write command for activating CLE. The apparatus for controlling NAND flash memory outputs 'HIGH' through a control signal line CLE, outputs 'LOW->HIGH' through a control signal line WE, and outputs '0x80 ' to the I/O bus. Third through seventh micro-commands are WRS(address information, ALE) which corresponds to a single write command for activating ALE and for defining an address. For each of the third through seventh micro-commands, the apparatus for controlling NAND flash memory outputs 'HIGH' through a control signal line ALE, outputs 'LOW->HIGH' through the control signal line WE, and outputs 'address information' to the I/O bus.

An eighth micro-command is WAIT(0x10) which corresponds to a wait command for waiting for a predetermined amount of time. The apparatus for controlling NAND flash memory waits for internal clocks having the number corresponding to '0x10'. A ninth micro-command is WDM (0x200) which corresponds to a multiple write command for executing a single write operation of 512 times. The apparatus for controlling NAND flash memory outputs 'LOW->HIGH' through the control signal line WE for each single write operation and outputs each data to the I/O bus. A tenth micro-command is WRS(0x30, CLE) which corresponds to a single write command for activating CLE. The apparatus for controlling NAND flash memory outputs 'HIGH' through a control signal line CLE, outputs 'LOW->HIGH' through the control signal line WE, and outputs '0x30' to the I/O bus. An eleventh micro-command is WAIT(0x10) which corresponds to a wait command for waiting for a predetermined amount of time. The apparatus for controlling NAND flash memory waits for internal clocks having the number corresponding to '0x10'.

A twelfth micro-command is RB($RB_0$, HIGH) which corresponds to a state check command for checking the state of NAND flash memory. The apparatus for controlling NAND flash memory monitors time when a state signal output from the zeroth NAND flash memory chip set becomes 'HIGH'. A thirteenth micro-command is WRS(0x70, CLE) which corresponds to a single write command for activating CLE. The apparatus for controlling NAND flash memory outputs 'HIGH' through the control signal line CLE, outputs 'LOW->HIGH' through the control signal line WE, and outputs '0x70' to the I/O bus. A fourteenth micro-command is WDS ($IR_0$) which corresponds to a single write command. The apparatus for controlling NAND flash memory outputs 'LOW->HIGH' through the control signal line RE and outputs a value recorded in $IR_0$ of the register bank to the I/O bus. A fifteenth micro-command is CE(0, HIGH) which corresponds to a chip enable signal for selecting the zeroth NAND flash memory chip set. The apparatus for controlling NAND flash memory outputs 'HIGH' through the signal line $CE_0$. A sixteenth micro-command is END which corresponds to a command indicating an end of the macro-command. The apparatus for controlling NAND flash memory terminates the operation of controlling NAND flash memory.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

Industrial Applicability

According to the present invention, various commands are actively generated such that NAND flash memory having unique operation characteristics according to each manufacturer is effectively controlled. In addition, NAND flash memory is controlled based on a script in which a series of commands for controlling NAND flash memory are described, so that time required to control NAND flash memory is reduced. Furthermore, when the same operation of controlling NAND flash memory is performed, the script can be re-used, and when a different operation of controlling NAND flash memory is performed, the script can be edited and re-used such that the capacity of memory needed to control NAND flash memory is effectively used.

The invention claimed is:

1. An apparatus for controlling NAND flash memory, the apparatus comprising:
   a register unit storing a start address of a macro-command to be executed, wherein macro-commands are described in a command script, and wherein each macro-command comprises a plurality of micro-commands in an array for controlling a unit operation of NAND flash memory;
   a command fetch unit, if a start address of the macro-command to be executed is recorded in the register unit, accessing first memory connected based on the start address of the macro-command to be executed and sequentially reading the plurality of micro-commands from the start address of the macro-command to be executed;
   a command interpretation unit interpreting the read micro-commands and outputting the result of interpretation including types of the micro-commands and command parameters; and
   a command execution unit generating interface signals for controlling an operation of NAND flash memory according to each of the micro-commands based on the result of interpretation.

2. The apparatus of claim 1, wherein the register unit comprises:
   a first register storing a start address of a macro-command to be executed, wherein macro-commands are described in a command script; and
   a second register storing a start address of a macro-command array to be executed,
       wherein macro-command arrays are described in a command script comprising at least one macro-command array, and
       wherein each macro-command array comprises a plurality of micro-command arrays for controlling a unit operation of NAND flash memory and if the start address of the macro-command array to be executed is recorded in the second register, the command fetch unit accesses first memory connected based on the start address of the macro-command array to be executed, sequentially reads start addresses of the macro-command from the start address of the macro-command array to be executed, and sequentially reads the plurality of micro-commands that constitute each macro-command from the first memory based on the start address of each macro-command.

3. The apparatus of claim 2, wherein final data of the macro-command array is a macro-command array end command that indicates an end of the macro-command array, and if the macro-command array end command is read, the command fetch unit stops an additional operation of reading the start address of each macro-command.

4. The apparatus of one of claims 1 to 3, wherein final data of the macro-command array is a macro-command end command that indicates an end of the macro-command, and if the macro-command end command is read, the command fetch unit stops an additional operation of reading the micro-commands.

5. The apparatus of one of claims 1 to 3, wherein each of the interface signals is a NAND flash memory control signal selected from the group consisting of a single read signal RDS for reading data once from NAND flash memory, a single write signal WRS for writing data once in NAND flash memory, a multiple read signal RDM for reading data a plurality of times from NAND flash memory, a multiple write signal WRM for writing data a plurality of times in NAND flash memory, a chip enable (CE) signal for selecting a NAND flash memory chip for operation control from a plurality of NAND flash memory chips, a state check signal RB for checking a state of a NAND flash memory chip selected from the plurality of NAND flash memory chips, a wait signal WAIT for delaying for a predetermined number of times of an internal clock period, and an end signal END for ending an operation of controlling NAND flash memory.

6. The apparatus of one of claims 1 to 3, further comprising a register bank unit in which a plurality of registers in which a value of a command parameter that constitutes the micro-commands is recorded, are arranged in an array shape, wherein the command interpretation unit reads the value recorded in a register corresponding to a number of a register defined due to the command parameter of the micro-commands and provides the read value to the command execution unit.

7. The apparatus of one of claims 1 to 3, further comprising a data management unit which reads data stored in the connected second memory and provides the read data to the command execution unit or which receives the data read from NAND flash memory through an input/output (I/O) bus from the command execution unit and stores the data in the second memory, wherein the register unit comprises a third register in which a data start address that indicates a start point of data write in the second memory and a start point of data write from the second memory by using the data management unit, is recorded.

8. An apparatus for controlling NAND flash memory, the apparatus comprising:
a register unit storing a start address of a macro-command array to be executed, wherein selected from macro-command arrays are described in a command script, and wherein each macro-command array comprises a plurality of micro-command arrays for controlling a unit operation of NAND flash memory;
a command fetch unit, if the start address of the macro-command array to be executed is recorded in the register unit, accessing first memory connected based on the start address of the macro-command array to be executed, sequentially reading start addresses of the macro-command from the start address of the macro-command array to be executed, and sequentially reading the plurality of micro-commands that constitute each macro-command from the first memory based on the start address of each macro-command;
a command interpretation unit interpreting the read micro-commands and outputting the result of interpretation including types of the micro-commands and command parameters; and
a command execution unit generating interface signals for controlling an operation of NAND flash memory according to each of the micro-commands based on the result of interpretation.

9. The apparatus of claim 8, wherein final data of the macro-command array is a macro-command array end command that indicates an end of the macro-command array, and if the macro-command array end command is read, the command fetch unit stops an additional operation of reading the start address of each macro-command.

10. The apparatus of claim 8 or 9, wherein final data of the macro-command array is a macro-command end command that indicates an end of the macro-command, and if the macro-command end command is read, the command fetch unit stops an additional operation of reading the micro-commands.

11. The apparatus of one of claims 8 to 9, wherein each of the interface signals is a NAND flash memory control signal selected from the group consisting of a single read signal RDS for reading data once from NAND flash memory, a single write signal WRS for writing data once in NAND flash memory, a multiple read signal RDM for reading data a plurality of times from NAND flash memory, a multiple write signal WRM for writing data a plurality of times in NAND flash memory, a chip enable (CE) signal for selecting a NAND flash memory chip for operation control from a plurality of NAND flash memory chips, a state check signal RB for checking a state of a NAND flash memory chip selected from the plurality of NAND flash memory chips, a wait signal WAIT for is delaying for a predetermined number of times of an internal clock period, and an end signal END for ending an operation of controlling NAND flash memory.

12. The apparatus of one of claims 8 to 9, further comprising a register bank unit in which a plurality of registers in which a value of a command parameter that constitutes the micro-commands is recorded, are arranged in an array shape, wherein the command interpretation unit reads the value recorded in a register corresponding to a number of a register defined due to the command parameter of the micro-commands and provides the read value to the command execution unit.

13. The apparatus of one of claims 8 to 9, further comprising a data management unit which reads data stored in the connected second memory and provides the read data to the command execution unit or which receives the data read from NAND flash memory through an input/output (I/O) bus from the command execution unit and stores the data in the second memory, wherein the register unit comprises a third register in which a data start address that indicates a start point of data write in the second memory and a start point of data write from the second memory by using the data management unit, is recorded.

14. The apparatus of claim 10, wherein each of the interface signals is a NAND flash memory control signal selected from the group consisting of a single read signal RDS for reading data once from NAND flash memory, a single write signal WRS for writing data once in NAND flash memory, a multiple read signal RDM for reading data a plurality of times from NAND flash memory, a multiple write signal WRM for writing data a plurality of times in NAND flash memory, a chip enable (CE) signal for selecting a NAND flash memory chip for operation control from a plurality of NAND flash memory chips, a state check signal RB for checking a state of a NAND flash memory chip selected from the plurality of NAND flash memory chips, a wait signal WAIT for is delaying for a predetermined number of times of an internal clock period, and an end signal END for ending an operation of controlling NAND flash memory.

15. The apparatus of claim 10, further comprising a register bank unit in which a plurality of registers in which a value of a command parameter that constitutes the micro-commands is recorded, are arranged in an array shape, wherein the command interpretation unit reads the value recorded in a register corresponding to a number of a register defined due to the command parameter of the micro-commands and provides the read value to the command execution unit.

16. The apparatus of claim 10, further comprising a data management unit which reads data stored in the connected second memory and provides the read data to the command execution unit or which receives the data read from NAND flash memory through an input/output (I/O) bus from the command execution unit and stores the data in the second memory, wherein the register unit comprises a third register in which a data start address that indicates a start point of data write in the second memory and a start point of data write from the second memory by using the data management unit, is recorded.

* * * * *